United States Patent [19]

Young et al.

[11] Patent Number: 5,275,061
[45] Date of Patent: Jan. 4, 1994

[54] CORIOLIS MASS FLOWMETER

[75] Inventors: Alan M. Young, Los Gatos; Danny Hoang, Santa Clara; Gerald F. Cabak, Santa Cruz, all of Calif.

[73] Assignee: Exac Corporation, San Jose, Calif.

[21] Appl. No.: 699,056

[22] Filed: May 13, 1991

[51] Int. Cl.$^5$ ............................................. G01F 1/84
[52] U.S. Cl. ............................................. 73/861.38
[58] Field of Search ....................... 73/861.37, 861.38

[56] References Cited

U.S. PATENT DOCUMENTS

| | | |
|---|---|---|
| Re. 31,450 | 11/1983 | Smith . |
| 4,422,338 | 12/1983 | Smith . |
| 4,622,858 | 11/1986 | Mizerak ...................... 73/861.38 |
| 4,730,501 | 3/1988 | Levien . |
| 4,756,198 | 7/1988 | Levien . |
| 4,803,867 | 2/1989 | Dahlin ........................ 73/861.38 |
| 4,811,606 | 3/1989 | Hasegawa et al. . |
| 4,914,956 | 4/1990 | Young et al. . |
| 5,060,523 | 10/1991 | Lew . |
| 5,078,014 | 1/1992 | Lew ............................ 73/861.38 |

*Primary Examiner*—Herbert Goldstein
*Attorney, Agent, or Firm*—Claude A. S. Hamrick

[57] ABSTRACT

Coriolis mass flowmeter apparatus comprising a flow-sensing structure including a support, a conduit having an input segment affixed to the support, an output segment affixed to the support, an elongated active inlet segment having a first end and a second end, the first end adjoining the input segment, an elongated outlet segment having a third end and a fourth end, the fourth end adjoining the output segment, and a connecting segment connecting the second and third ends of the inlet and outlet segments, the inlet and outlet segments being disposed to lie within a common plane, a driver connected between mid-portions of the inlet and outlet segments and operative to drive the inlet and outlet segments such that they oscillate in antiphase relationship within the common plane, sensors affixed to the support and at least one of the inlet and outlet segments and operative to detect Coriolis force-induced motion of the conduit and to generate output signals corresponding thereto; and a signal processor responsive to the output signals and operative to indicate the mass flow rate of material flowing through the conduit.

11 Claims, 6 Drawing Sheets

CORIOLIS MASS FLOWMETER

BACKGROUND OF THE INVENTION

1. Field of the Invention

The present invention relates generally to Coriolis type mass flowmeters and more particularly to an improved mass flowmeter having a flow-sensing structure in which both driving and responsive vibrations are experienced in a plane defined by the looped structure.

2. Description of the Prior Art

Most existing Coriolis mass flowmeters utilize flow-sensing structures including two tubes, or tube segments, with flow directed through them in a hydraulically serial or "parallel" manner. The use of two separate tubes is the favored configuration in that it allows tuning-fork-like vibrational modes as a means of cancelling out common mode vibrations and extraneous noise. However, the use of two tubes and their associated manifolding and/or flow-splitting parts normally make the device expensive, and the presence of flow-splitting or manifolding castings may make it extremely difficult to meet sanitary/cleanability requirements for interior surface finish.

Many dual-tube Coriolis flowmeters are also not self-draining and are thus not suitable for applications where high-level sanitation or contamination of residual material is of concern. Moreover, dual tube Coriolis meters that split the flow often experience clogging in one of the tubes which can go undetected and give rise to measurement error in addition to sanitary problems.

One approach to solving the sanitary problem is disclosed in Levien et al., U.S. Pat. No. 4,730,501, entitled "Single Tube Parallel Flow Coriolis Mass Flow Sensor". In this device, elongated crossing portions of a single length of looped conduit form parallel sensor segments, the ends of which are defined by isolation plates secured to corresponding opposite ends of the segments. While this approach clearly solves the sanitary and cleanliness problem, it has the disadvantage that, since both ends of the active tube segments are normally fixedly supported, fluid temperature changes give rise to axial stresses that adversely effect meter performance.

Some Coriolis flowmeters have flexible joints, couplings or conduit loops that render them susceptible to pressure changes, sanitary, cleanability and drainability problems. One example of a relevant device having a flexible intermediate section coupling an active inlet segment to an active outlet segment is disclosed in the U.S. Pat. No. 4,811,606, to Hasegawa et al., entitled "Mass Flowmeter". In such apparatus the straight tubular segments are fixed at one end and swung by a vibrator at the opposite end, such that the distal ends of the tubes alternately approach and depart to and from each other. The ends of the tubes subjected to vibration are connected by a flexible tube. However, it is now understood that flow measurement errors can result from the use of such a flexible tube in the following ways:

1) Vibrational drive motion can be damped by a flexible section thereby causing variations in "drive" excitation. Damping can also compromise (i.e. dampen) the responsiveness of such a structure to Coriolis forces.
2) Pressure changes can introduce unwanted motions/distortions into the flow tube assembly (and hence flow measurement errors) due to the adverse pressure sensitivity of a flexible intermediate section whose flexibility arises from a conduit section that is deformed or shaped in the form of a loop or a bellows-like structure or from another flexible material such as rubber or plastic. Hydrostatic pressure changes can cause variations in the elasticity of a flexible section, further complicating the ability to obtain accurate flow measurements.
3) In addition to the pressure sensitivities of a flexible section, the temperature variation of its elastic modulus (in addition to that of the inlet/outlet sections) may contribute additional flow measurement errors and other errors from variable zero flow offsets.
4) Flexible sections made of an elastic material or bellows may not meet the "sanitary" or cleanability requirements of many food, pharmaceutical, beverage or chemical applications, nor will a flexible section comprised of loops necessarily be self-draining.
5) A flexible section fabricated from bent conduit and looped in some manner will also present a higher pressure drop to the flowing fluid due to the additional number of turns presented to the flowing fluid, thereby further restricting the usable flow range of the meter.
6) The use of a flexible intermediate section may require that the flexible section be attached or somehow secured to the support. If so, then additional and unwanted stresses may be introduced into the flow tube structure.

SUMMARY OF THE INVENTION

It is therefore a principal object of the present invention to provide a novel Coriolis flowmeter structure that is substantially free of the above-mentioned disadvantages.

Another object of the present invention is to provide a device of the type described wherein the operative conduit may be made of a single length of material.

Another object of the present invention is to provide a device of the type described which is substantially insensitive to moderate changes in temperature and pressure.

Another object of the present invention is to provide a device of the type described which is capable of meeting high level sanitation and non-contamination requirements.

Briefly, a preferred embodiment of the present invention includes a single length of conduit which is continuous from input connection to output connection and requires no flow splitter or manifold. A simple configuration is that comprised of two straight sections of conduit joined together and forming a U-shaped flow path. The fluid flow portion is formed by an inlet segment that extends outwardly from the support, a joining segment that changes the direction of the flow, and an outlet segment that extends back to the support. The input end of the inlet section and output end of the outlet section are solidly mounted/attached to the support. The measurement or operative portions of the conduit are the inlet segment and outlet segment and are confined between "isolation plates" which, because of their shape and elasticity, provide a different elasticity and vibratory boundary condition for the active inlet and outlet segments than would otherwise be inherent in tubular sensor structures rigidly attached to a support at both ends or flexibly joined at one end. The operative tube segments are vibrated relative to each other in antiphase relationship in the plane of the two segments in a tuning-fork manner, but unlike most other Coriolis flow-sensors, the direction of flow in one segment is opposite to the direction of flow in the other segment. A plurality of motion responsive detectors, at least one of which has a fixed spatial reference, are used to measure conduit motion, and the signals developed by such detectors are processed to develop an output signal that is proportional to mass flow rate.

When flow is present in the tube, the resulting distribution of Coriolis forces exerted on each operative segment is identical in magnitude and direction, unlike that of other two-conduit Coriolis flow-sensors wherein the direction of flow is the same and the resulting vibratory response motion of one tube segment relative to the other is asymmetric (i.e. 180° out of phase) as opposed to a symmetric response (i.e. in phase). This apparatus is to be contrasted to other "twin-tube meters" wherein motion responsive detection means are mounted between corresponding points on the conduits so as to measure relative conduit motion from which a usable mass flow rate value is derived.

Signal detection means using methodology such as that disclosed in U.S. Pat. No. 4,914,956 by Young and Blake can be used. Alternatively, an entirely different approach using a time difference or a phase difference related back to mass flow rate could also be used.

A significant advantage of fixedly supporting the structure from only one end is the elimination of pipe stresses, differential thermal stresses or other axial (and transverse) stresses or disturbances that could couple or transmit into the flow tube structure if the "intermediate section", or joining segment, were fixed or attached to a support. For example, in accordance with the present invention, the entire flow tube structure is free to expand or contract thermally independently from the support without the attendant axial stresses that otherwise would adversely affect meter performance were the active portions of the structure fixedly supported at both ends.

Another advantage of fixedly supporting the structure from only one end is that the stiffness of the inlet and outlet sections in response to Coriolis forces is reduced (i.e. sensitivity to Coriolis forces is increased) as compared to a structure wherein the active tube segments are fixedly supported at both ends. Other parallel straight tube Coriolis meters which have a fixed support end to end typically require substantially long tube segments in order to provide for sufficient sensitivity to Coriolis forces. Furthermore, in order to deal with axial stresses in the flow tubes, such structures frequently require flexible or bent sections, or the use of flexible seals. The sensitivity of the present apparatus is enhanced several fold (on the order of a factor of 5 to 15 depending on its structural parameters) over an otherwise identical structure fixedly supported at both ends, or in comparison with a dual straight tube parallel flow Coriolis flowmeter of identical length. This means that the length of the inlet and outlet sections could be at least a factor of 5 times shorter in accordance with the present invention and provide the same sensitivity to flow rate as compared to a straight tube parallel flow Coriolis meter. Alternatively, it can provide greater signal at a given flow rate than a comparably sized parallel flow dual straight tube meter as a result of this enhanced sensitivity.

These and other objects and advantages of the present invention will become apparent to those skilled in the ar following a review of the following descriptions of the preferred embodiments illustrated in the several figures of the drawing.

DETAILED DESCRIPTION OF THE PREFERRED EMBODIMENTS

Figure 1:
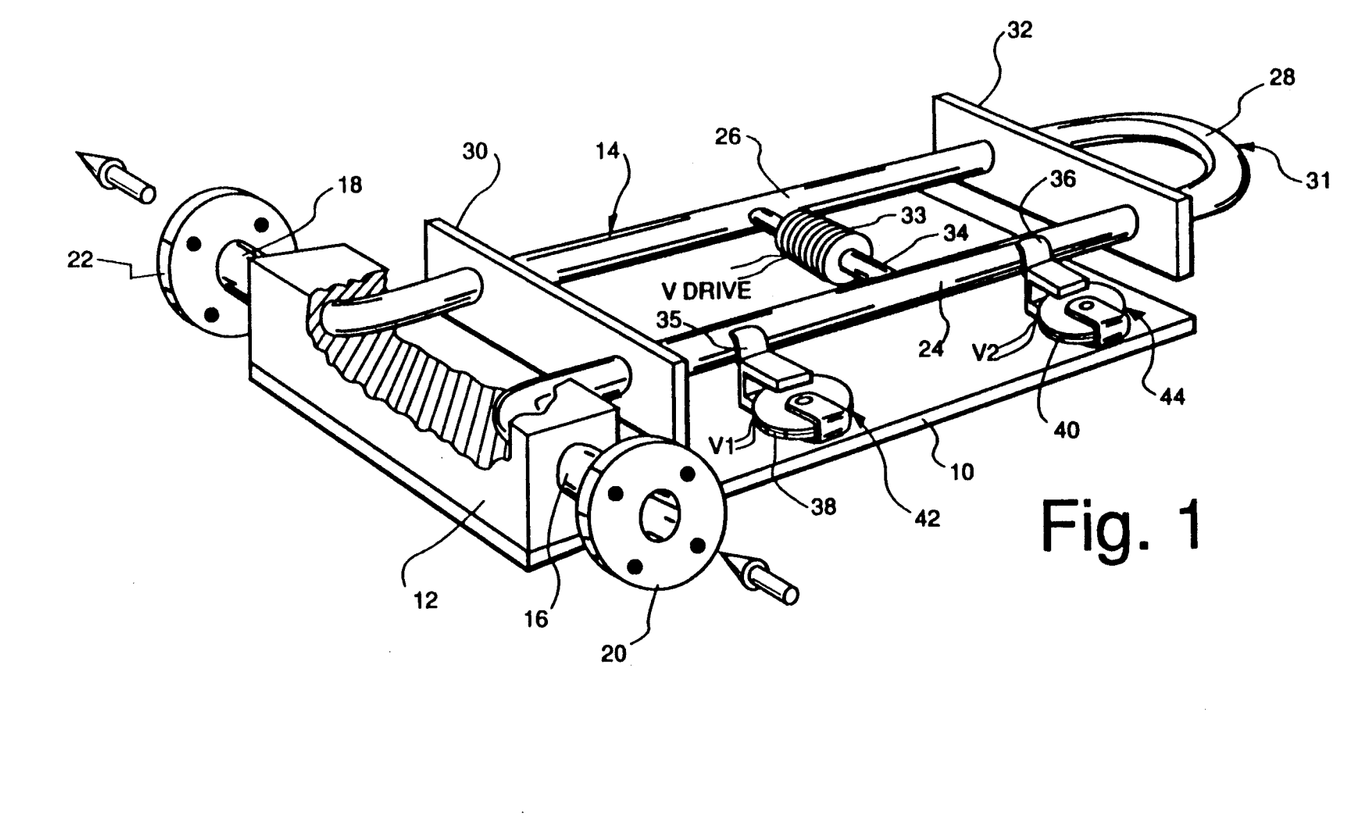
FIG. 1 is a perspective view illustrating a preferred embodiment of a tubular mass flow sensor structure in accordance with the present invention.

Referring now to FIG. 1 of the drawing, a first embodiment of the present invention is illustrated and includes a base plate 10 to which is affixed a tube support body 12 that is either cast about, or assembled to conform to, a continuous generally U-shaped tube 14 having end segments 16 and 18 turned outwardly and fitted with flanges 20 and 22 respectively forming input and output couplings. Tube 14 is configured to include a straight inlet segment 24, a straight outlet segment 26, and a connecting segment 28. Rigidly attached to and spanning segments 24 and 26 proximate opposite ends thereof are isolation plates 30 and 32 which are welded to tube 14. Note that the U-shaped portion of tube 14 is supported in cantilever fashion from body 12 and lies within a plane generally parallel to, but lying above, the upper surface of plate 10. The distal or bite end 31 of the loop formed by tube 14 is totally unsupported.

Although not shown to scale, in one embodiment a 0.375" OD tube was deformed to provide inlet and outlet segments approximately 16 inches long and separated by approximately 1.5 inches.

A drive apparatus of a well-known type, including a drive coil 33 attached to tube segment 26 and a magnet 34 attached to tube segment 24, is positioned midway along the lengths of the tube segments, and when energized with an alternating drive signal serves to drive segments 24 and 26 toward and away from each other in the plane of the loop.

Also attached to inlet segment 24, at approximately the quarter points along its length, are magnet assemblies 35 and 36 which act in concert with coil assemblies 38 and 40 to form motion sensors 42 and 44 respectively.

Figure 2:
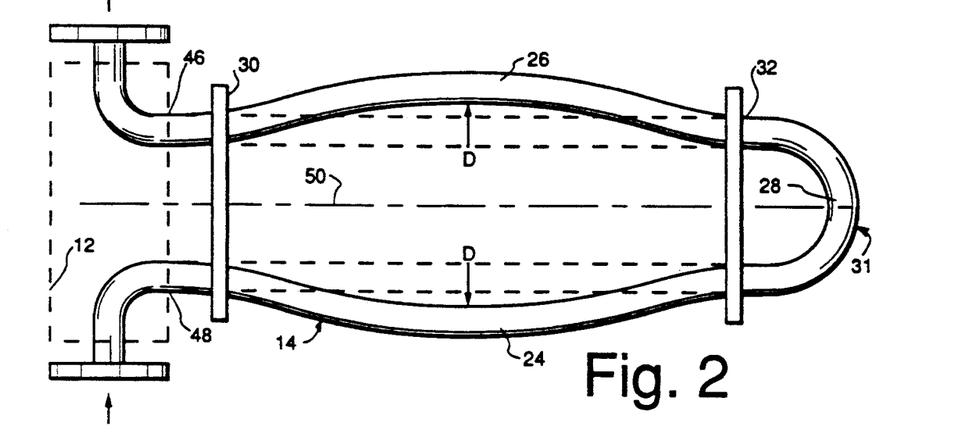
FIG. 2 is a partial top plan view of the sensor of FIG. 1 illustrating deformation in the drive mode.

Turning now to FIG. 2 of the drawing, tube 14 is shown in plan view deformed outwardly in exaggerated proportion in response to drive forces D, and evidencing the oppositely directed motion of corresponding points along the length of inlet segment 24 and outlet segment 26. Note that the deformations begin and end at the isolation plates 30 and 32. This eliminates stress, due to drive forces, at the points 46 and 48 of attachment to body 12. It will of course be appreciated that, when the directions of the drive forces D are reversed, the segments 24 and 26 will be resiliently deformed inwardly toward each other. If the drive forces D are oscillatory at angular frequency $W_D$, which is at or near the natural oscillatory frequency of segments 24 and 26, as is determined by their mechanical characteristics, the segments will oscillate in "tuning-fork" fashion moving in antiphase with respect to each other relative to loop axis 50 in the plane of the loop.

Figure 3:
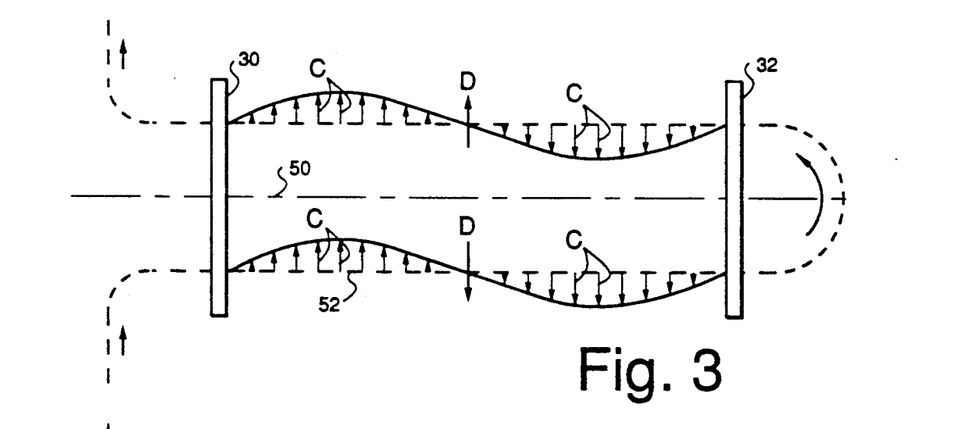
FIG. 3 is a diagram schematically illustrating Coriolis forces generated in response to the drive motion depicted in FIG. 2.

If during the application of drive forces D, as illustrated in FIG. 2, a fluid mass is caused to flow through tube 14, it Will be apparent from FIG. 3 that, as a result of the tube deflection, Coriolis forces will result and be distributed along the lengths of segments 24 and 26 as illustrated by the arrows C. These forces will obviously reverse in direction about the tube centerline 52 as the drive direction reverses. It will be observed that although the drive deformation of one tube segment is the mirror image of the drive deformation of the other about the longitudinal axis 50 of the loop formed by tube 14, the opposite directions of flow in segments 24 and 26 will result in a nonsymmetric (non-mirror image) distribution of the force C about the same axis.

Figure 4:
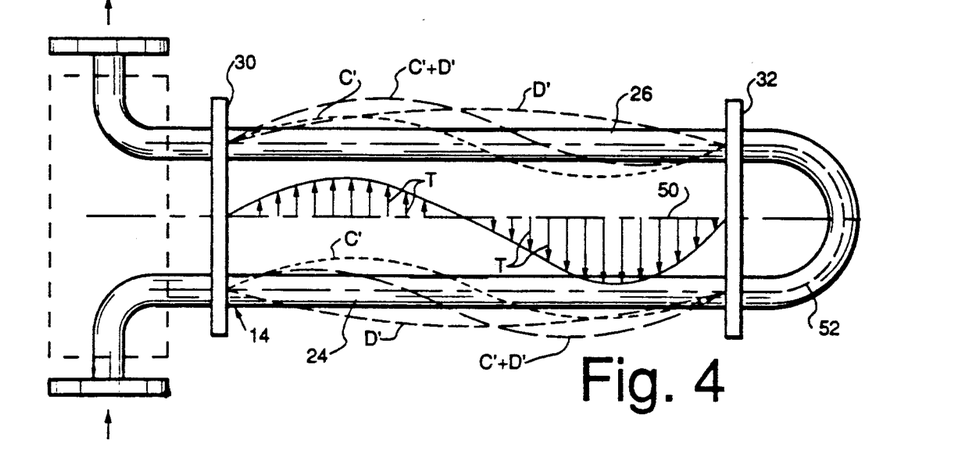
FIG. 4 is diagram schematically illustrating the combined forces experienced by the sensor structure as a result of the drive and Coriolis forces.

In order to illustrate the resultant forces applied to tube 14 due to the combined action of the drive forces D and Coriolis forces C, reference is made to FIG. 4 of the drawing wherein the incremental forces are algebraically summed first along the tube axis 52 to illustrate the net forces C'+D' applied to the tube segments 24 and 26, and then along the loop axis 50 to depict the resultant forces T applied to the overall cantilevered loop portion of the sensor structure. It will thus be appreciated that a force moment will be applied to the cantilevered loop tending to cause rotation in the clockwise direction (i.e., downwardly in the plane of the loop), and since the distal end 31 of the loop is unrestrained, it will be displaced in the clockwise direction as illustrated by the dashed lines 31' in FIG. 5 of the drawing. It will of course be understood that when the drive direction is reversed, the Coriolis moment will likewise be reversed and the distal end 31 of the loop will be deflected in the upward or counter-clockwise direction (not shown).

In accordance with the present invention the subject apparatus achieves enhanced sensitivity from a structural viewpoint with an inflexible intermediate section that is unsupported. The drive means 33,34 vibrates the inlet and outlet sections 24,26 against one another in the plane (or imaginary surface) containing the inlet and outlet sections. The intermediate, or connecting, section 28 is neither attached nor fixed to any support. The alternating moments created in the structure by the applied vibrational drive excitation are cancelled in the isolation plate 30 at one end of the flow tube structure and in the connecting section and identical isolation plate 32, or by selective isolation plate means (not shown) of the type described by Mitzner in U.S. Pat. No. 4,781,069 and disposed at the distal end.

It is not clear how such moments could be cancelled if the structure had a flexible connecting section of the type disclosed by the previously referenced Hasegawa et al. Depending on the nature of the flexibility and the "lossiness" of the flexible material, such moments may be absorbed rather than cancelled. Such influences would preclude low power operation of the drive excitation means, impair the ability of the structure to vibrate resonantly, and cause zero flow instability.

As depicted in FIG. 2, the amplitude of vibration due to drive excitation of the inlet and outlet sections 24, 26 is nearly zero at both ends of the sections and is a maximum near the location of the vibrational drive means approximately in the middle of the length of the inlet-outlet flow tube structure. This is in contrast to Hasegawa et al. who, as indicated at column 4, lines 51–54. Of the patent, locates a vibrating driver at the ends of a pair of straight tube portions resulting in vibrational amplitude which becomes increasingly larger toward the end of the straight tube sections (see column 6, lines 8–10). The nature, i.e. mode or shape, of the vibrations introduced by the vibratory excitation apparatus according to the present invention is thus materially different from that of Hasegawa et al. Furthermore, in contrast to Hasegawa et al. the present invention would not work if the drive means were located at the distal ends of the inlet and outlet sections because of the apparatus's inflexible "intermediate" or connecting section 28.

Figure 5:
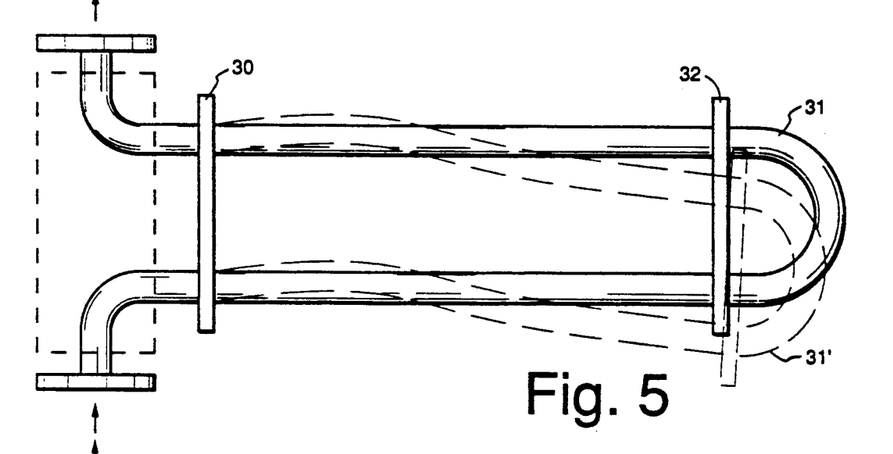
FIG. 5 is a top plan view illustrating the deformation of the sensor structure resulting from the forces illustrated in FIG. 4.

Referring again to FIGS. 2-5 which disclose one possible vibratory mode of excitation (other excitation modes are also possible), the vibratory means of excitation excites the structure's fundamental asymmetric drive mode. "Asymmetric" refers to the fact that the two straight tube sections are vibrated one against the other, 180° out of phase. With fluid flow present, the structure elastically deforms in response to the Coriolis forces generated by the momentum of the fluid interacting with the vibratory drive excitation as depicted in FIG. 5. It is interesting that the Coriolis forces distributed along the inlet and outlet tubes are substantially the same in magnitude and direction, as shown in FIG. 3, and cause the inlet and outlet tube structure to elastically deform in a manner not apparent in any prior art device. More specifically, the Coriolis forces tend to deform each tube section in the same direction. This means that separately measuring the relative motion of any two correspondingly opposite points on the inlet and outlet sections 24, 26 will not and cannot provide any information regarding flow rate.

Accordingly, an absolute spatial reference for the motion sensing pickups is an essential requirement to perform any flow rate measurement with this type of structure, i.e., one employing two tubular sections of conduit joined inflexibly with flow oppositely directed through each section. Hasegawa et al. are silent with regard to the necessity of providing some spatially fixed sensing means. Furthermore, Hasegawa et al. specifically call for sensing mean for detecting relative displacement of the first and second tube portions. This would not work as applied to the present invention.

Additional flow measurement errors result in Hasegawa et al. from referencing the sensors to the "fulcrum" because the fulcrum provides a mechanical path for tube vibrations (which naturally are at the meter-operating frequency) to couple from the vibrating tubes into and through the sense magnet support member and into the sensor's signals. In accordance with the present invention the spatial reference for motion sensing must be independent of any influence from tube movement or vibration.

Although other prior art Coriolis meters employ a single sensing tube (e.g., Smith U.S. Pat. No. 31,450 and Smith U.S. Pat. No. 4,422,338) and depict spatially fixed sensing means, they have no fundamental requirement for doing so since both active tube segments are driven in the same direction. In U.S. Pat. No. 4,756,198 Levien shows spatially fixed coils in a magnet coil pick-up arrangement but performs a measurement of relative motion of the two conduit sections that is equivalent to having sense means mounted only on each tube. Thus, the fact that a sensor is depicted in a drawing with a spatially fixed mounting does not necessarily mean that such a fixed mounting is essential or fundamental to the meter's operation.

Figure 6:
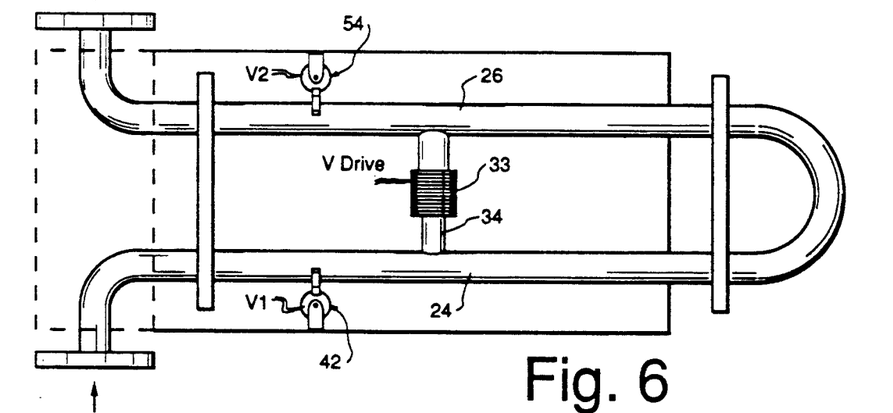
FIG. 6 is a top plan view illustrating an alternative arrangement of the motion responsive detectors.
Figure 7:
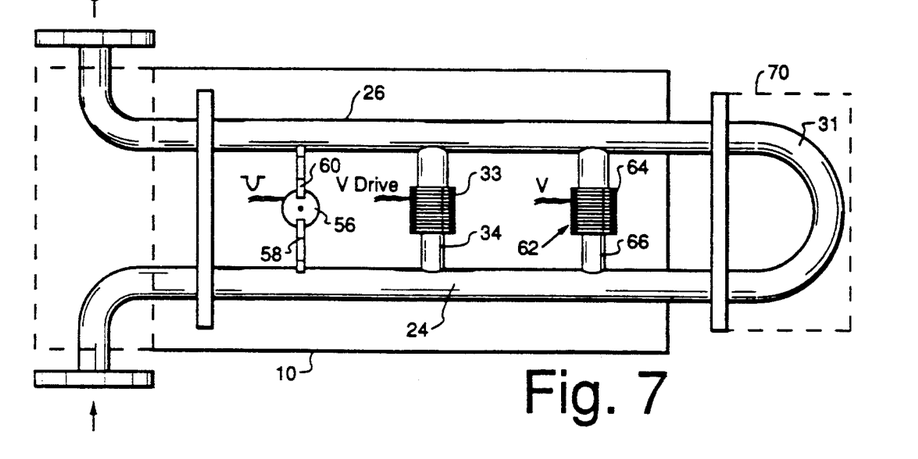
FIG. 7 is a top plan view illustrating a second alternative arrangement of the motion responsive detectors.

Rather than sensing Coriolis forces or their magnitude, or sensing displacement (which may subject to positional errors relative to a fixed spatial reference due to mechanical, pressure or temperature influences), the preferred embodiment of the present invention utilizes sensors of the velocity or acceleration type to obtain information regarding flow rate. Different configurations and locations of sensor placement on the inlet and outlet sections 24, 26 are illustrated in FIGS. 6 and 7. However, in each case the embodiment requires that at least one of the motion sensing transducers have a fixed spatial reference.

Referring now to FIG. 6 of the drawing, a second alternative embodiment is depicted and is identical to the FIG. 1 embodiment except that the sensor 44 has been moved to a position along segment 26 directly opposite sensor 42 and has been relabeled sensor 54. As will be explained below, the only difference in signal processing is that the sign of the output $V_2$ is changed.

In FIG. 7 a second alternative embodiment is depicted wherein different types of sensors are utilized at the quarter points of the inlet and outlet segments 24 and 26. In this embodiment a single coil 56 is attached to base 10 at a quarter point position intermediate the active tube segments 24 and 26, and is adapted to simultaneously interact with magnets 58 and 60 respectively carried by inlet segment 24 and outlet segment 26. As a consequence, the signal v output by coil 56 represents a signal proportional only to the structure's relative absolute velocity of movement due to its response to Coriolis forces. A second sensor 62 including a coil 64, attached to a quarter point of outlet segment 26, and a magnet 66, attached to a quarter point along inlet segment 24, provides an output signal V which is proportional to the velocity of movement of inlet segment 24 relative to that of outlet segment 26 at the sense location.

In accordance with the present invention as depicted in FIG. 1, two spatially fixed coils 38 and 40 are associated with sensing magnet assemblies 35 and 36 that are affixed to inlet segment 24 at approximately the quarter points along its length and on opposite sides of the midpoint to which the drive magnet 34 is affixed. In response to motion of inlet segment 24 the movement of magnet assemblies 35 and 36 relative to the coil assemblies 38 and 40 respectively, will cause voltage signals $V_1$ and $V_2$ to be induced in the windings of the respective coils. It will be appreciated that the difference between $V_1$ and $V_2$ is a measure of difference in absolute motion (i.e. velocity), and that the sum of such signals (i.e., $V_1 + V_2$) represents their relative velocity due only to driving motion. Accordingly, the time integrated velocity difference signal voltage divided by the sum signal voltage can be related proportionally to fluid flow rate.

The following provides an illustration, in mathematical terms, of how the various sensor configurations depicted in FIGS. 1, 6 and 7 can be used to determine mass flow rate. While the symbols used to describe the assorted variables for the various configurations may be the same from one configuration to another, no implication is made regarding the relative magnitude of a given variable from one configuration to another.

| | |
|---|---|
| $V_1$ and $V_2$: | Represent signals proportional to the absolute velocity of motion at the location of the associated sensor. With "velocity" pick-ups this signal is proportional to the time rate of change of position of the sensor. |
| $A_D$: | Proportional to the peak amplitude of relative movement at the sense location due only to drive excitation. |
| $A_C$: | Proportional peak amplitude of absolute movement at the sensing location as a result of the Coriolis forces distributed along the inlet-outlet conduit sections. |
| w: | Proportional to the drive frequency f expressed in radians/second, (i.e., $= 2\pi f$). |
| t: | Time in seconds. |
| F(wt): | Represents the periodic behavior of the positional displacement of the sensor over time at a given location due to drive excitation. It may be sinusoidal, it may be a highly distorted function but, in general, need only be a periodic function of time. That is, $F(wt + 2\pi) = F(wt)$. |
| dm/dt: | Represents mass flowrate in units of mass/time. |
| k: | A proportionality constant that depends on temperature and the flowmeters' dynamic amplification factor. |
| k': | A proportionality constant that depends on temperature and also contains the meter calibration factor for a given sensor configuration and the constant k. |
| V: | Represents a signal proportional to the relative velocity of movement at the sense location due to drive excitation only. |
| v: | Represents a signal proportional only to the velocity of movement of the two segments relative to the stationary pick-up coil in response to Coriolis forces. |
| < >: | RMS or average voltage. |

FIG. 1 Sensor Configuration:

No Flow: $V_1 = V_2 = A_D \times dF(wt)/dt$

Flow:
$V_1 = A_D \times dF(wt)/dt - A_C \times dF(wt + \pi/2)/dt$
$V_2 = A_D \times dF(wt)/dt + A_C \times dF(wt + \pi/2)/dt$
$A_C = k \times A_D \times w \times dm/dt$ $$dm/dt = k' \times \frac{<\int(V_2 - V_1) \times dt>}{<V_2 + V_1>}$$

FIG. 6 Sensor Configuration:

No Flow:
$V_1 = -A_D \times dF(wt)/dt$
$V_2 = A_D \times dF(wt)/dt = -V_1$

Flow:
$V_1 = -A_D \times dF(wt)/dt + A_C \times dF(wt + \pi/2)/dt$
$V_2 = A_D \times dF(wt)/dt + A_C \times dF(wt + \pi/2)/dt$
$A_C = k \times A_D \times w \times dm/dt$ $$dm/dt = k' \times \frac{<\int(V_1 + V_2) \times dt>}{<V_2 - V_1>}$$

FIG. 7 Sensor Configuration

No Flow: $v = 0$
$V = 2 \times A_D \times dF(wt)/dt$

Flow:
$v = 2 \times A_C \times dF(wt + \pi/2)/dt$
$V = 2 \times A_D \times dF(wt)/dt$
$A_C = k \times A_D \times w \times dm/dt$ -continued $$dm/dt = k' \times \frac{<\int v dt>}{<V>}$$

Figure 8:
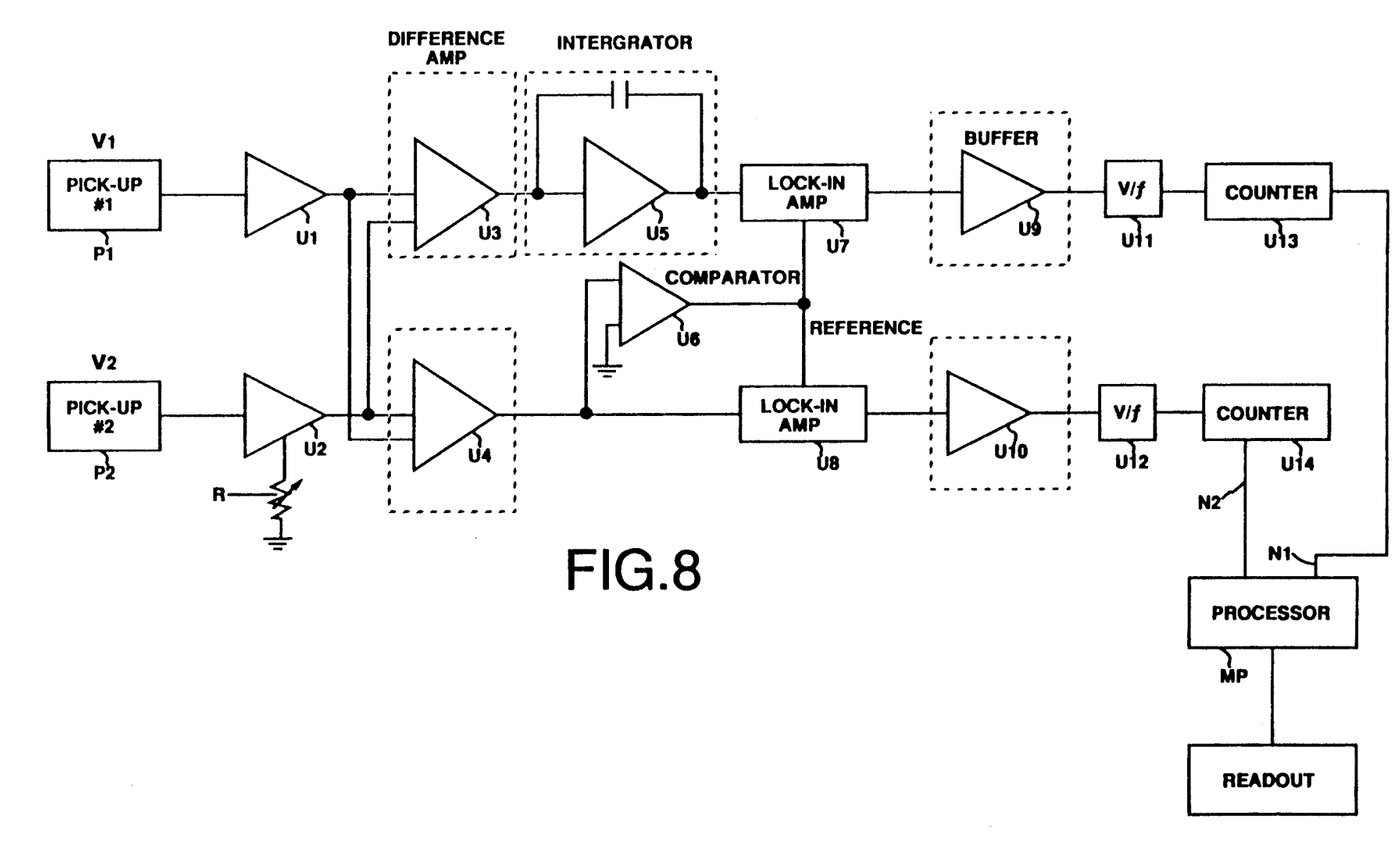
FIG. 8 is a block diagram illustrating a signal processing circuit suitable for use with the embodiments of FIGS. 1 and 6.
Figure 9:
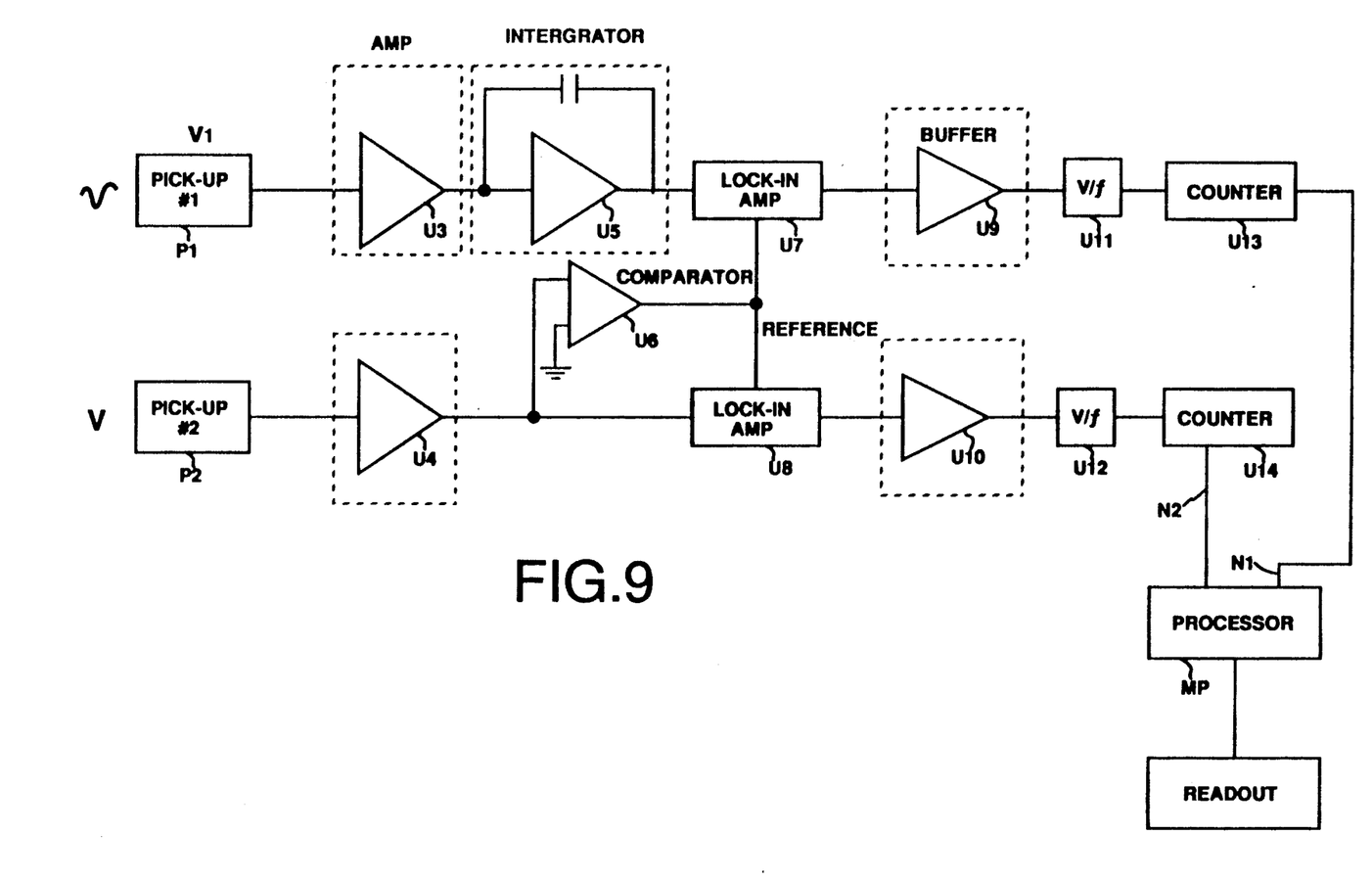
FIG. 9 is a block diagram schematically illustrating a signal processing circuit suitable for use with the embodiment of FIG. 7.

The above-described functional equations can be implemented by single processing systems such as those depicted in FIGS. 8 and 9. More specifically, the output signals $V_1$ and $V_2$ obtained from the embodiments of FIGS. 1 and 6 can be processed by the circuit of FIG. 8. The "pick-ups" obviously correspond to the sensors depicted in the earlier Figures. Operation of this circuit is described in detail in the above-referenced Young et al. U.S. Pat. No. 4,914,956, and such disclosure is incorporated herein by reference.

The output signals v and V obtained from the embodiment of FIG. 7 may be processed by a circuit of the type illustrated in FIG. 9. In this case v plays a role similar to that of the difference signal and V is similar to that of the sum signal referred to in FIG. 8.

As a further modification, it may be appropriate to enclose or "cast" the distal end 31 (FIG. 7) of the loop in a block-like housing, one or more rigid plates, or a rigid potting compound, as suggested by the dashed lines 70, in order to insure that the outboard ends of the tube segments 24 and 26 are rigidly tied together. One of the effects of adding such mass is to reduce the "Coriolis" or response modal frequency compared to that of the drive frequency.

Figure 10:
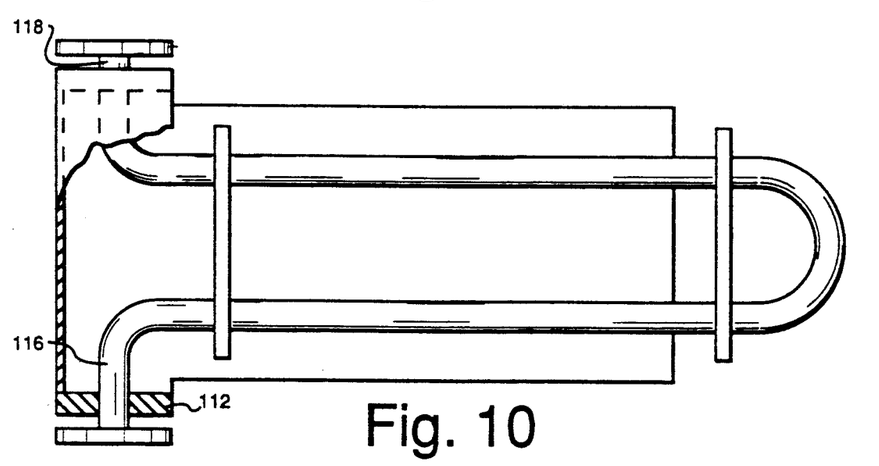
FIGS. 10 and 11 illustrate alternate loop configurations for use in accordance with the present invention.
Figure 11:
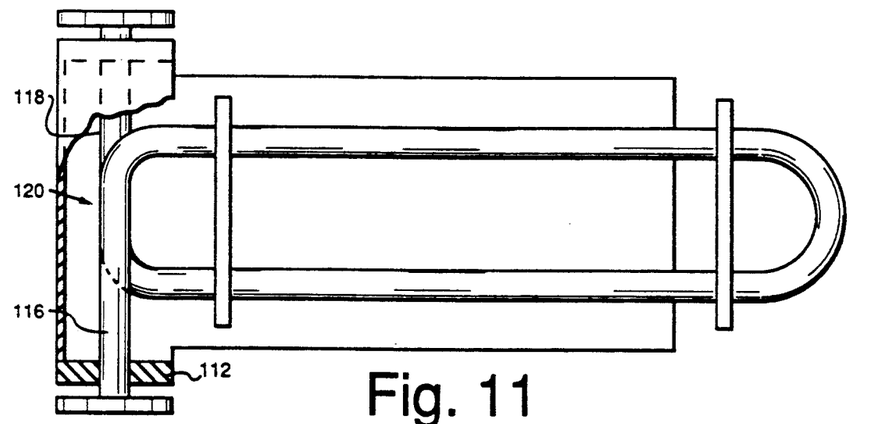

It will be appreciated that tube flexibility, and thus the device sensitivity, can be enhanced in some applications by rigidly securing only the tube tails, or end segments, 116 and 118 to the support structure 112 as depicted in FIG. 10. Moreover, by using a cross-over loop tube configuration as depicted at 120 in FIG. 11, even greater tube flexibility can be obtained. For simplicity, no drive means or sense means are shown in FIGS. 10 and 11.

Although the preferred embodiments of the present invention include a single continuous conduit, it will be appreciated that such conduit could in fact be comprised of two or more constituent parts appropriately joined together to form a functional equivalent to the structures illustrated. Furthermore, although a "U-shaped" loop design has been disclosed, it is contemplated that other configurations such as V-shapes, omega shapes or rectangular shapes could also be used so long as the active portions of such shapes are mirror-image or bilaterally symmetrical about an axis lying in the plane of the loop and for the sensitive portion of the structure between plates 30 and 32. Similarly, tubes having cross-sections other than circular could also be used. It is therefore intended that the appended claims be interpreted broadly as covering all alterations and modifications which fall within the true spirit and scope of the invention.

What is claimed is:

1. Coriolis mass flowmeter apparatus comprising:
   a flow-sensing structure including,
   support means,
   conduit means having an input segment affixed to said support means, an output segment affixed to said support means, an elongated active inlet segment having a first end and a second end, said first end adjoining said input segment, an elongated outlet segment having a third end and a fourth end, said fourth end adjoining said output segment, and a connecting segment connecting said second and said third ends of said inlet and outlet segments, said inlet and outlet segments being disposed to lie within a common plane,
   first means for rigidly connecting said second and third ends together,
   drive means connected between mid-portions of said inlet and outlet segments and operative to drive said inlet and outlet segments such that they oscillate in antiphase relationship within said common plane,
   sensing means affixed to said support means and at least one of said inlet and outlet segments and operative to detect Coriolis force-induced motion of said conduit means and to generate output signals corresponding thereto; and
   signal processing means responsive to said output signals and operative to indicate the mass flow rate of material flowing through said conduit means.

2. Coriolis mass flowmeter apparatus as recited in claim 1 wherein said sensing means includes a first motion sensor disposed midway between said one end and the point at which said drive means is connected to said inlet segment, and a second motion sensor disposed between the point that said drive means is connected to said inlet segment and said second end, said first and second motion sensors being operative to develop first and second output signals for input to said signal processing means.

3. Coriolis mass flowmeter apparatus as recited in claim 1 wherein said first and second motion sensors detect motion of portions of said inlet segment relative to said support means.

4. Coriolis mass flowmeter apparatus as recited in claim 1 wherein said sensing means includes a first motion sensor disposed between said first end and the point at which said drive means is connected to said inlet segment, and a second motion sensor disposed between said fourth end and the point at which said drive means is connected to said outlet segment.

5. Coriolis mass flowmeter apparatus as recited in claim 4 wherein said first motion sensor detects motion of a portion of said inlet segment relative to said support means, and said second motion sensor detects motion of a portion of said outlet segment relative to said support means.

6. Coriolis mass flowmeter apparatus as recited in claim 1 wherein said sensing means includes a first motion sensor connected to said support means and disposed midway between said first and fourth ends and the points at which said drive means is connected to said inlet segment and said outlet segment, said first sensor being operative to detect motion of portions of said inlet and outlet segments relative to said support means, and a second motion sensor disposed between said second and third ends and the points to which said drive means is connected to said inlet and outlet segments, said second motion sensor being operative to detect the relative motion between portions of said inlet and outlet segments.

7. Coriolis mass flowmeter apparatus as recited in claim 1, 2, 3, 4, 5 or 6 and further comprising second means for rigidly connecting said first and said fourth ends together.

8. Coriolis mass flowmeter apparatus as recited in claims 2, 3, 4 or 5 wherein said signal processing means includes differencing means responsive to the outputs of said first and second motion sensors and operative to generate a difference signal which is proportional to the voltage difference therebetween;

summing means responsive to the outputs of said first and second motion sensors means and operative to generate a sum signal which is proportional to the sum of the voltages thereof;

integrating means for integrating said difference signal; and dividing means for dividing the integrated difference signal by said sum signal to develop an output signal proportional to the mass flowrate of material flowing through said conduit means.

9. Coriolis mass flowmeter apparatus as recited in claim 6 wherein said signal processing means includes integrating means for integrating the output of said first motion sensor; and dividing means for dividing the integrated output of said first motion sensor with the output of said second motion sensor to develop an output signal proportional to the mass flowrate of material flowing through said conduit means.

10. Coriolis mass flowmeter apparatus as recited in claim 8, and further comprising second means for rigidly connecting said first and said fourth ends together.

11. Coriolis mass flowmeter apparatus as recited in claim 9, and further comprising second means for rigidly connecting said first and said fourth ends together.

* * * * *